(12) United States Patent
Wijnands et al.

(10) Patent No.: US 8,111,702 B1
(45) Date of Patent: Feb. 7, 2012

(54) CONFIGURING ROUTE PROPERTIES FOR USE IN TRANSPORT TREE BUILDING

(75) Inventors: Ijsbrand Wijnands, Leuven (BE); Arjen Boers, Sitges (ES); Toerless Eckert, Mountain View, CA (US); Stefano Previdi, Rome (IT)

(73) Assignee: Cisco Technology, Inc., San Jose, CA (US)

( * ) Notice: Subject to any disclaimer, the term of this patent is extended or adjusted under 35 U.S.C. 154(b) by 153 days.

(21) Appl. No.: 11/960,985

(22) Filed: Dec. 20, 2007

(51) Int. Cl.
*H04L 12/28* (2006.01)

(52) U.S. Cl. ......... 370/400; 370/351; 370/408; 370/256

(58) Field of Classification Search .................. 370/392, 370/400
See application file for complete search history.

(56) References Cited

U.S. PATENT DOCUMENTS

| | | | |
|---|---|---|---|
| 5,946,316 A * | 8/1999 | Chen et al. .................... | 370/408 |
| 2002/0126671 A1* | 9/2002 | Ellis et al. ..................... | 370/390 |
| 2002/0150099 A1* | 10/2002 | Pung et al. .................... | 370/390 |
| 2007/0030846 A1* | 2/2007 | Szczesniak et al. .......... | 370/389 |
| 2007/0274235 A1* | 11/2007 | Boers et al. ................... | 370/256 |

* cited by examiner

*Primary Examiner* — Huy Vu
*Assistant Examiner* — Maria Sekul
(74) *Attorney, Agent, or Firm* — Campbell Stephenson, LLP

(57) ABSTRACT

A mechanism is provided by which a transport tree identifier can be generated comprising both an opaque field, containing information that cannot be interpreted by core routers, and a non-opaque field, containing information that can be interpreted by core routers. The transport tree identifier is then used in the process of building a transport tree across a transport network. A transport network egress router can receive a request to join a multicast datastream from a downstream node outside of the transport network. The information contained in the join message that identifies the desired multicast datastream is encoded in the opaque field of the transport tree identifier. Information related to desired route properties is encoded in the non-opaque field, for interpretation by the core routers. The non-opaque field can also include an identifier of a root node core router for the transport tree. Route properties can be provided, for example, by selection and transmission from the customer itself, or route properties can be associated with a particular customer or associated with a port of an egress router coupled to the customer network.

17 Claims, 9 Drawing Sheets

CONFIGURING ROUTE PROPERTIES FOR USE IN TRANSPORT TREE BUILDING

FIELD OF THE INVENTION

This invention relates to the field of information networks, and more particularly relates to transporting a datastream across a transport network by building a transport tree using a transport tree identifier that includes information about route properties of the transport tree.

BACKGROUND OF THE INVENTION

Today's network links carry vast amounts of information. High bandwidth applications supported by these network links include, for example, streaming video, streaming audio, and large aggregations of voice traffic. In the future, network bandwidth demands are certain to increase. As a business grows, so can its network, increasing in the number of network elements coupled to the network, the number of network links, and also geographic diversity. Over time, a business' network can include physical locations scattered throughout a city, a state, a country, or the world. Since it can be prohibitively expensive to create a private network that spans these great distances, many businesses opt to rely upon a third-party provider's network to provide connectivity between the disparate geographic sites of the business. In order for the business' network to seamlessly function through the provider network, the provider network must be able to provide a medium for transmission of all the business' various types of datastreams, including multicast transmission.

Since a provider network can support communication from several customers at a time, it is desirable to provide those customers different routing property options in how data may be transmitted across the provider network. Options may be expressed to provide various quality of service (QoS) selections (e.g., faster/more expensive connection, slower/cheaper connection, and redundant connections. It may also be desirable to provide load balancing in the provider network so that certain core routers do not get over loaded with traffic, while others continue to have surplus bandwidth. QoS and load balancing can be performed, for example, by defining various topologies within the provider network.

A transport tree is defined through the provider network to define a path for a customer's data, either unicast or multicast. It is desirable that the definition of the transport tree be responsive to the routing properties required by the customer. In order to enable such responsiveness, routing property identification is interpreted by core routing nodes within the provider network. It is therefore further desirable that a mechanism be provided to supply the core routing nodes in the provider network with identification of the desired routing properties during the building of a transport tree through the provider network.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1A:
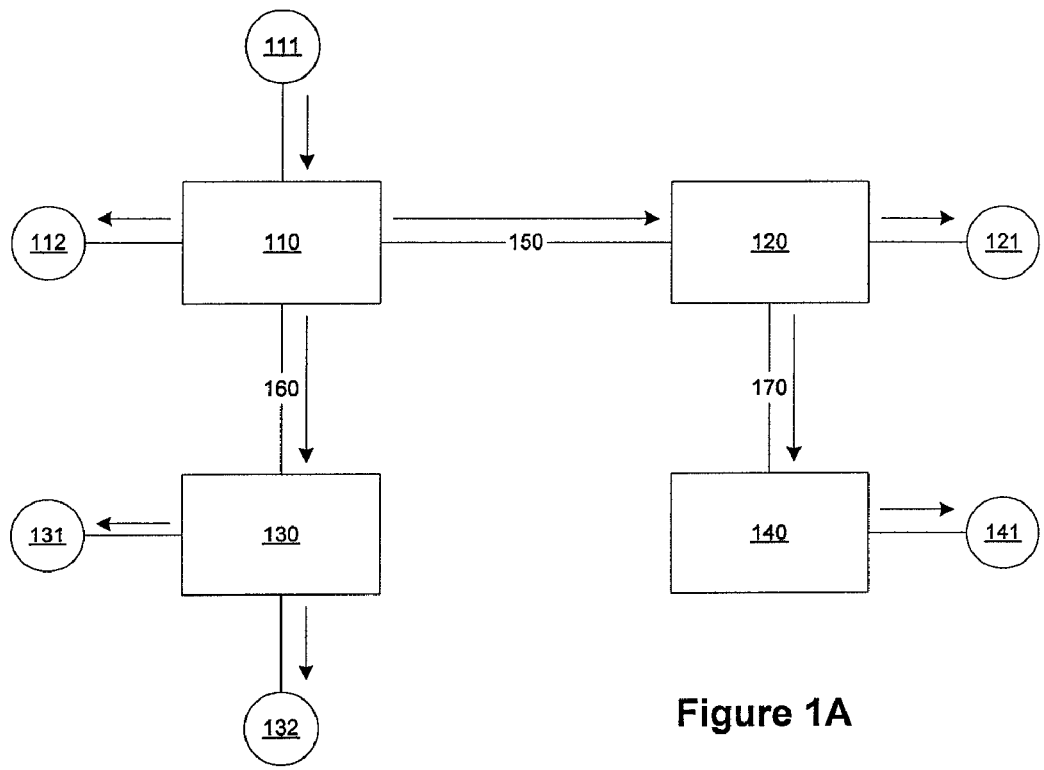
FIG. 1A is a simplified block diagram of a network performing a multicast transmission.

The present invention provides a mechanism by which a transport tree identifier can be generated comprising both an opaque field, containing information that cannot be interpreted by core routers, and a non-opaque field, containing information that can be interpreted by core routers. The transport tree identifier is then used in the process of building a transport tree across a transport network. For example, a transport network egress router can receive a request to join a multicast datastream from a downstream node outside of the transport network. The information contained in the join message that identifies the desired multicast datastream is encoded in the opaque field of the transport tree identifier. Information related to desired route properties is encoded in the non-opaque field, for interpretation by the core routers. In a further aspect of the invention, the non-opaque field also includes an identifier of a root node core router for the transport tree. Route properties can be provided, for example, by selection and transmission from the customer itself, or route properties can be associated with a particular customer (e.g., do they pay for a particular QoS), or associated with a port of an egress router coupled to the customer network.

A transport tree building message is then generated and sent from the egress router to the ingress router associated with the source of the multicast datastream via the core routers. Transport tree building messages contain the transport tree identifier as such messages propagate across the transport network. In a typical transport network, core routers within the transport network do not interpret a transport tree identifier beyond using the transport tree identifier as a mechanism for identifying the transport tree across the transport network. In a transport network including core routers having embodiments of the present invention, the core routers also interpret the non-opaque field of the transport tree identifier in order to make routing decisions.

Upon receiving a transport tree building message incorporating the transport tree identifier, an ingress router can decode the opaque field of the transport tree identifier to determine the multicast datastream identifying information. The ingress router can use the multicast datastream identifying information to (1) link the multicast datastream with the transport tree so that packets from the multicast datastream are transmitted along that transport tree, and (2) transmit to an upstream router or network element, outside of the transport network, a request to join the identified multicast datastream.

Multicast Transmission

Multicast routing protocols enable multicast transmission (i.e., one-to-many connections and many-to-many connections) by replicating a multicast network packet close to the destination of that packet, obviating the need for multiple unicast connections for the same purpose; thus, saving network bandwidth and improving throughput. Upon receiving a multicast packet, a network node can examine a multicast group destination address (GDA) of the packet and determine whether one or more downstream subscribers to the multicast packet (i.e., members of the multicast group) are connected to the network node (either directly or indirectly). The network node can then replicate the multicast packet as needed and transmit the replicated packets to any connected subscribers.

FIG. 1A is a simplified block diagram of a network performing a multicast transmission. Network router elements 110, 120, 130 and 140 are coupled through network links 150, 160, and 170. Network router element 110 is also coupled to network elements 111 and 112; network router element 120 is coupled to network element 121; network router element 130 is coupled to network elements 131 and 132; and, network router element 140 is coupled to network element 141. Such coupling between the network router elements and the network elements can be direct or indirect (e.g., via a L2 network device or another network router element).

For the purposes of this illustration, network element 111 is a multicast source transmitting to a multicast group that includes network elements 112, 121, 131, 132 and 141. A multicast datastream having a group destination address to which the above network elements have subscribed as receiver members is transmitted from network element 111 to network router element 110 (illustrated by the arrow from 111 to 110). Network router element 110 determines where to forward multicast datastream packets by referring to an internal address table that identifies each port of network router element 110 that is coupled, directly or indirectly, to a subscribing member of the multicast group. Network router element 110 then replicates multicast datastream packets and transmits the replicated packets from the identified ports to network element 112, network router element 120 and network router element 130.

Network router elements 120 and 130 can inform network router element 110 that they are coupled to a multicast datastream subscriber using a network message format, such as protocol independent multicast (PIM). Using PIM, network router elements 120 and 130 can send messages indicating that they need to join (a "JOIN" message) or be excluded from (a "PRUNE" message) receiving packets directed to a particular multicast group or being transmitted by a particular source. Similarly, a network element can inform a first-hop network router element that the network element wishes to be a subscriber to a multicast group by sending a "JOIN" request through a software protocol such as internet group management protocol (IGMP). When a network element wishes to subscribe to a multicast transmission, a special IGMP protocol frame can be transmitted as a multicast "JOIN" request. An IGMP-enabled network router element (or a L2 network device) can have "snooping" software executing to read such a frame and build a corresponding entry in a multicast group address table.

Upon receipt by network router elements 120 and 130, multicast datastream packets can be replicated by those network router elements as needed in order to provide the multicast datastream to network elements coupled to those network router elements (e.g., network elements 131 and 132 or network router element 140). In this manner, a multicast datastream from network element 111 can be transmitted through a network to multiple receiving network elements. The path of such a transmission can be thought of as a tree, wherein network element 111 is the root of the tree and network elements 121, 131, 132, and 141 can be thought of as the tips of branches.

Figure 1B:
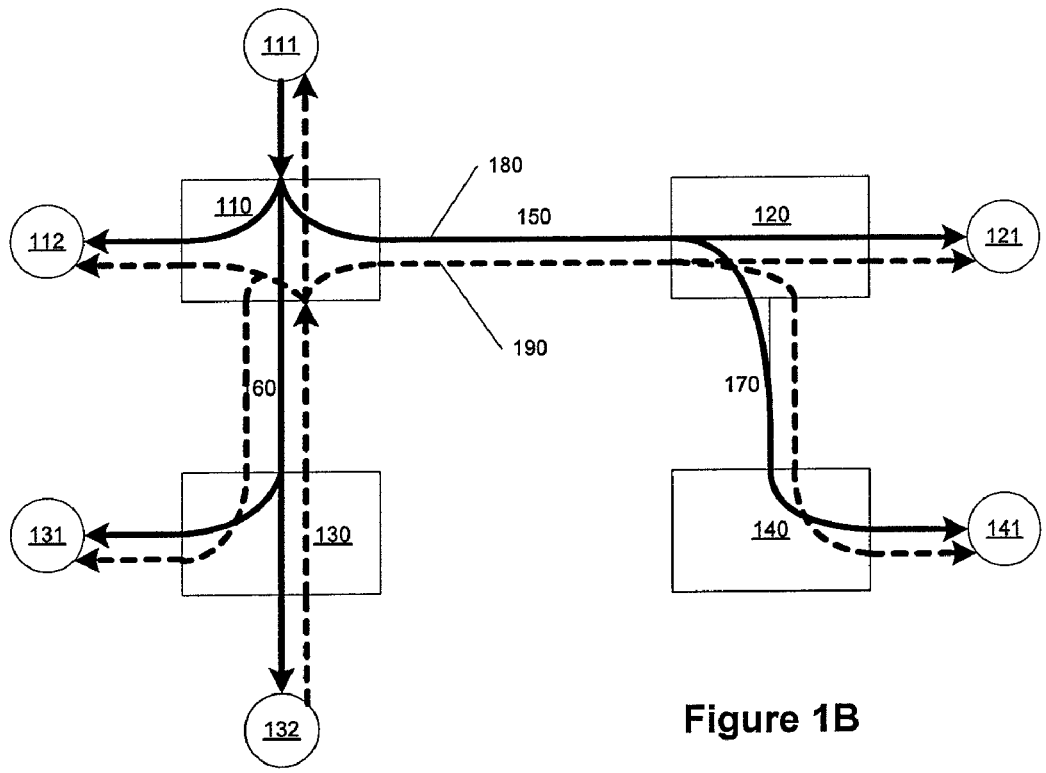
FIG. 1B is a simplified block diagram of a network in which multiple sources are transmitting to a single multicast group.

FIG. 1B is a simplified block diagram of a network in which multiple sources are transmitting to a multicast group. As in FIG. 1A, network element 111 is a source for a multicast datastream directed to a multicast group including network elements 112, 121, 131, 132, and 141. That multicast datastream is illustrated by path 180 (a solid line). Network element 132 is also transmitting a multicast datastream to the multicast group, and that datastream is illustrated by path 190 (a dashed line). In a multiple source multicast group, any subscriber network element can be a source. In order to provide this two-way routing of multicast data packets, a bi-directional version of protocol independent multicast (PIM bidir) is used to configure the network router elements in the multicast tree. In such bi-directional multicast, datastream packets are routed only along the shared bi-directional tree, which is rooted at a rendezvous point for the multicast group, rather than at a particular datastream source. Logically, a rendezvous point is an address (e.g., a network router element) that is "upstream" from all other network elements. Passing all bi-directional multicast traffic through such a rendezvous point, establishes a loop-free tree topology with a root at the rendezvous point.

FIGS. 1A and 1B illustrate transmission of multicast datastreams in a network in which the network router elements 110, 120, 130 and 140 are directly coupled with one another. But, as stated above, as a business and its network grow, a business' network can become geographically diverse, and therefore the path over which the datastream must flow can include an intervening third-party provider network.

Provider Networks

Figure 2:
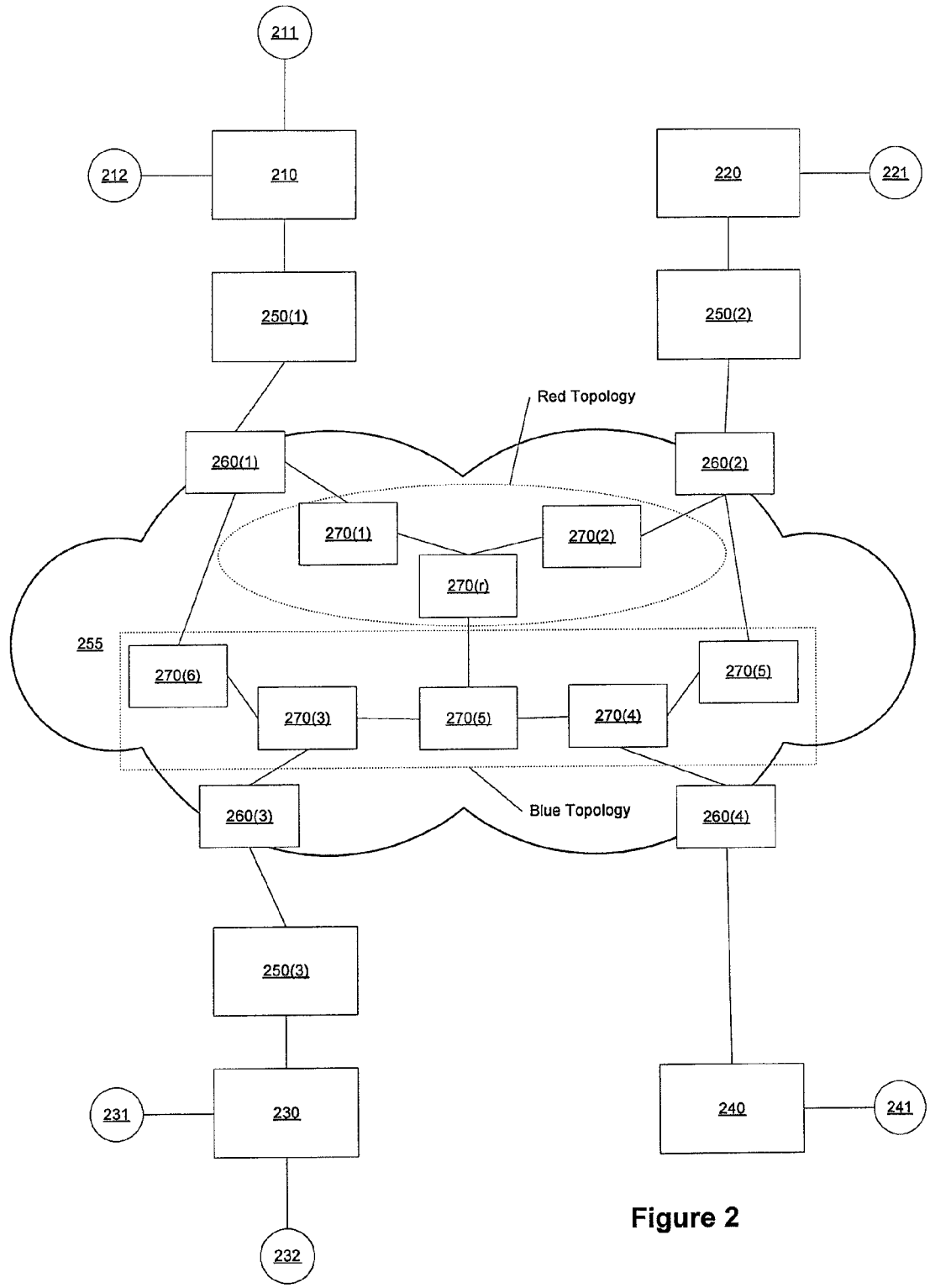
FIG. 2 is a simplified block diagram illustrating a network configuration in which geographically diverse subnets of a business' network are coupled through a third-party provider network.

FIG. 2 is a simplified block diagram illustrating a network configuration in which geographically diverse subnets of a business' network are coupled through a transport network 255 (also called a provider network). The business' network includes network router elements 210, 220, 230, and 240, wherein network router element 210 is coupled to network elements 211 and 212, network router element 220 is coupled to network element 221, network router element 230 is coupled to network elements 231 and 232, and network router element 240 is coupled to network element 241. In order to connect to the transport network, a network router element on the edge of the business' network (a customer edge router) is coupled to a network router element on the edge of the transport network (a provider edge router). In FIG. 2, customer edge router elements 250(1-3) are coupled to provider edge router elements 260(1-3), respectively. Network router element 240 is coupled to provider edge router element 260(4) (that is, network router element 240 is configured as a customer edge router).

It should be noted that customer edge router and provider edge router functionality can be provided by a single router. Further, a network router element such as 240 can also serve as an edge router. The provider edge routers provide access to the transport network which can contain data transmission lines, network router elements, and OSI Level 2 network devices to aid in the transmission of data from one provider edge router to another provider edge router. The transport network illustrated in FIG. 2 contains, as an example, network router elements 270(1-5) and 270(r), which are coupled in a manner to permit transmission of packets through the provider network. A transport network is not limited to such a configuration, and can include any number of network router elements, transmission lines, and other L2 and L3 network devices.

In order to facilitate transmission of data through the transport network, the transport network can utilize different protocols from those used in coupled customer networks. Such transport network protocols can permit faster data transmission and routing through the network. Any needed translation between customer and transport network protocols can be performed by the edge routers. One such routing protocol that can be used by a transport network is multiprotocol label switching (MPLS).

In a typical router-based network, OSI Layer 3 packets pass from a source to a destination on a hop-by-hop basis. Transit routers evaluate each packet's Layer 3 header and perform a routing table lookup to determine the next hop toward the destination. Such routing protocols have little, if any, visibility into the network's OSI Layer 2 characteristics, particularly in regard to quality of service and link load.

To take such Layer 2 considerations into account, MPLS changes the hop-by-hop paradigm by enabling edge routers to specify paths in the network based on a variety of user-defined criteria, including quality of service requirements and an application's bandwidth needs. That is, path selection in a router-only network (Layer 3 devices) can now take into account Layer 2 attributes. Path selection can also include other routing properties, such as topology selection. In light of this dual nature, MPLS routers are called label switch routers (LSRs).

In an MPLS network, incoming datastream packets are assigned a label by an edge label switch router (e.g., provider edge router element 260(1)). An edge LSR has one or more network interfaces connected to other LSRs within the provider network and one or more other network interfaces connected to non-MPLS enabled devices (e.g., a customer edge router). The label takes the form of a header created by the edge LSR and used by LSRs within the provider network to forward packets. An LSR will create and maintain a label forwarding information base (LFIB) that indicates where and how to forward packets with specific label values. The LSRs that are within a provider's network (non-edge LSRs) are commonly called core LSRs, which switch labeled packets based on the label value in the label header. All interfaces of a core LSR are connected to other LSRs (either core or edge). The path defined by the labels through core LSRs between a pair of edge LSRs is called a label switch path (LSP). Label information is distributed among the LSRs through the use of a label distribution protocol (LDP). LDP is also integral in building an LSP through an MPLS network. Packets are forwarded within the core network along the label switch path where each LSR makes forwarding decisions based solely on the contents of the label. At each hop, an LSR may strip off the existing label and apply a new label which tells the next hop how to forward the packet.

Figure 3:
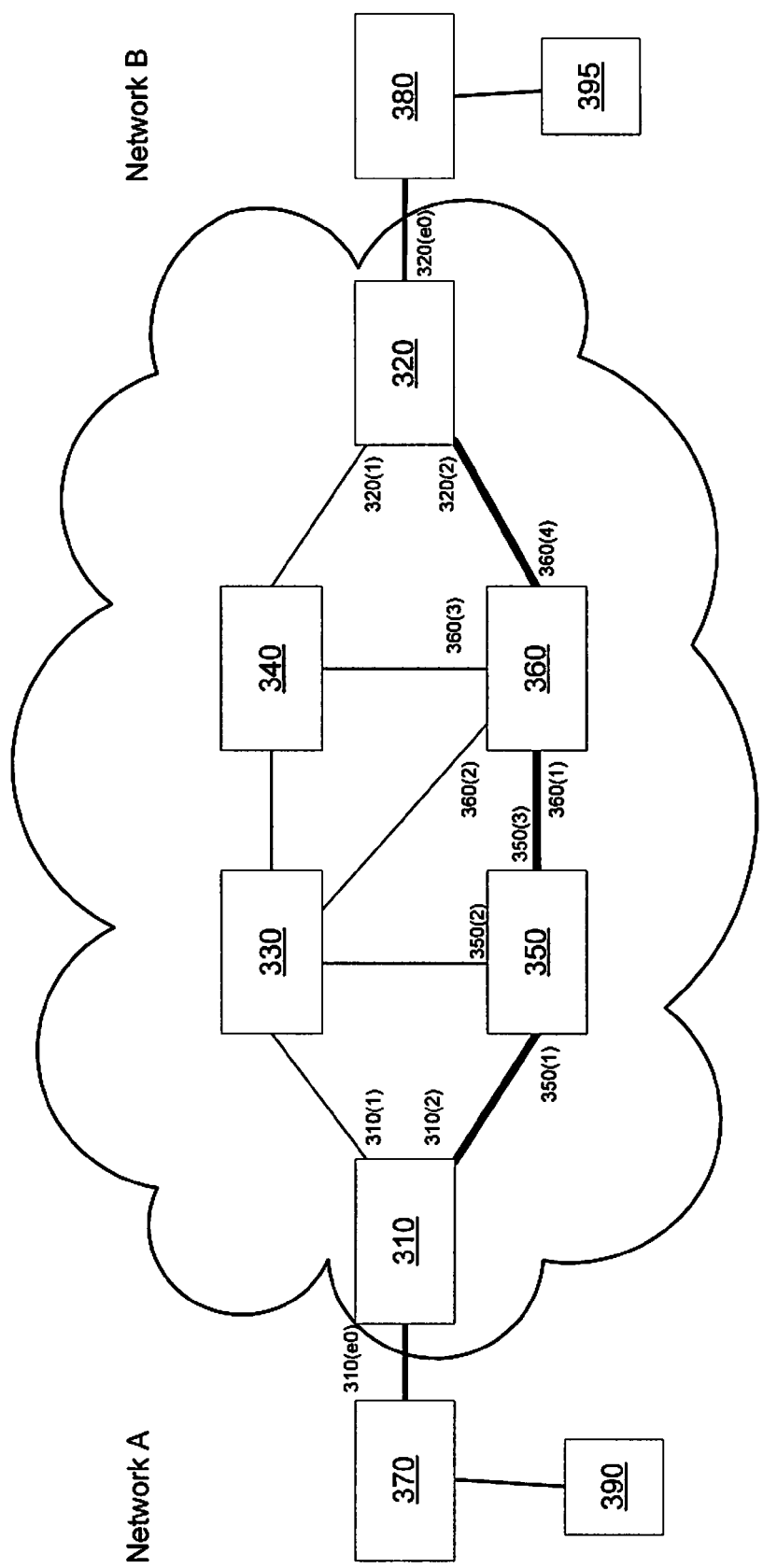
FIG. 3 is a simplified block diagram illustrating a datastream path through an MPLS network.

FIG. 3 is a simplified block diagram illustrating a path a datastream can take through an MPLS network. In FIG. 3, a series of LSRs (edge and core) interconnect, form a physical path between two network elements, 390 and 395, which are connected to the MPLS network through customer edge routers 370 and 380. An Ethernet frame carrying an IP datagram generated by network element 390 will follow the standard Ethernet format with a normal Layer 2 header followed by a Layer 3 header. Because the destination address resides in a different network, customer edge router 370 forwards a packet including the IP datagram to edge LSR 310. Edge LSR 310 references its internal forwarding table (also known as a forwarding information base (FIB)) and determines that it needs to forward a packet including the IP datagram via interface 310(2) toward edge LSR 320.

The core of the MPLS network includes core LSRs 330, 340, 350, 360, which are coupled, directly or indirectly, to edge LSRs 310 and 320.

The FIB entry for the destination network in ingress edge LSR 310 indicates that edge LSR 310 must include a label with a packet to indicate the path the packet should take on its way to egress edge LSR 320 and from there to destination network element 395. The label can be inserted before the Layer 3 header in the frame passed from edge LSR 310 to the next hop core LSR 350. Core LSR 350 receives the frame at interface 350(1) and determines the presence of the label. Core LSR 350 then treats the packet according to the configuration in its label forwarding information base (LFIB), which directs the core LSR to forward the packet via interface 350(3) and to replace the old incoming label with a new outgoing label. Core LSR 360 will then handle the packet in a similar manner, receiving the packet at interface 360(1) and transmitting the packet via interface 360(4), after having stripped the label added at core LSR 350 and inserting a new label.

Edge LSR 320 is the egress point from the MPLS network for the packet. Edge LSR 320 performs a label lookup in the same way as the previous LSRs, but will have no outgoing label to use. Edge LSR 320 will then strip off all label information and pass a standard packet including the IP datagram to customer edge router 380, which will then transmit the IP frame to network element 395. It should be noted that the LSP between edge LSRs 310 and 320 can take different links than the ones indicated in FIG. 3. The table below illustrates the incoming and outgoing interface and incoming and outgoing label changes that occur at each LSR in the illustrated LSP.

TABLE 1

| Router | Incoming Label | Incoming Interface | Destination Network | Outgoing Interface | Outgoing Label |
|--------|----------------|--------------------|--------------------| -------------------|----------------|
| 310    | —              | 310(e0)            | B                  | 310(2)             | 6              |
| 350    | 6              | 350(1)             | B                  | 350(3)             | 11             |
| 360    | 11             | 360(1)             | B                  | 360(4)             | 7              |
| 320    | 7              | 320(2)             | B                  | 320(e0)            | —              |

A non-MPLS router makes a forwarding decision based on reading a Layer 3 destination address carried in a packet header and then comparing all or part of the Layer 3 address with information stored in the forwarding information base (FIB) maintained by the router. The non-MPLS router constructs the FIB using information the router receives from routing protocols. To support destination-based routing with MPLS, an LSR also is configured to use routing protocols and construct the LFIB using information the LSR receives from these protocols. An LSR must distribute, receive, and use allocated labels for LSR peers to correctly forward the frame. LSRs distribute labels using a label distribution protocol (LDP). A label binding associates a destination subnet with a locally significant label (see, e.g., Table 1). Labels are "locally significant" because they are replaced at each hop.

Whenever an LSR discovers a neighbor LSR, the two LSRs establish a connection to transfer label bindings.

When an LSR receives a packet with a label, the LSR uses the label for an index search in the LSR's LFIB. Each entry in the LFIB consists of an incoming label (the LFIB index) and one or more subentries of the form: outgoing label, outgoing interface, and outgoing link-level information. If the LSR finds an entry with the incoming label equal to the label carried in the packet, for each component in the entry, the LSR replaces the label in the packet with the outgoing label, replaces link level information (such as the MAC address) in the packet with the outgoing link-level information, and forwards the packet over the outgoing interface. This forwarding decision uses an exact-match algorithm using a fixed-length, fairly short (as composed to an L3 address) label as an index. Such a simplified forwarding procedure enables a higher forwarding performance, and can be implemented in LSR hardware rather than software.

As stated above, transport network may not operate under the same protocols as do the coupled customer networks. Transport networks can operate, for example, using IPv4 with MPLS, while a customer network can use IPv6, IPv4, or another networking protocol. It is desirable to transmit multicast packets originating in an IPv6 or IPv4 customer network through a transport network. Multicast transmission through an MPLS network can result in multiple egress edge LSRs receiving a datastream entering the MPLS network at a single ingress edge LSR. Such a transport tree, a point-to-multipoint LSP, through an MPLS network has a similar form to the multicast tree discussed above, wherein the root of the tree is the ingress LSR. Similarly, multipoint-to-multipoint transport trees can be formed to transport multiple-source multicast datastreams.

As discussed above, FIG. 2 illustrates a scenario in which a geographically diverse customer network is coupled using a transport network 255. Network element 221 can transmit a join message for a multicast transmission from network element 211 to router element 220 using an appropriate protocol (e.g., IGMP). The join message can include a multicast source identifier (e.g., the address for network element 211) and a group destination address identifier. Router element 220 determines a next hop router in an upstream direction toward network element 211 (e.g., network router 250(2)) and transmits a router-to-router multicast membership request (e.g., a PIM join message). Router element 250(2) can perform a similar transmission to an upstream next-hop router, here transport network edge router 260(2). At this point, the upstream network path enters transport network 255.

The core routers of transport network 255 do not necessarily use protocols such as PIM, and therefore such protocols cannot be used to link routers through the transport network. As discussed above, a transport network can have a different set of protocols used to build transport trees across the network and through which the core routers can communicate (e.g., MPLS). By inspecting routing tables, edge router 260(2) can determine that edge router 260(1) is an upstream next-hop edge router toward the source of the desired multicast datastream. Through the use of transport tree building protocols for the transport network, a transport tree is built between edge routers 260(2) and 260(1). In the case of an MPLS transport network, a transport tree-building protocol is the label distribution protocol (LDP).

The path that the transport tree takes through the transport network can be determined by routing parameters associated with, for example, the customer or the type of communication. For example, multiple topologies can be configured that associate different core routers within transport network 255.

These topologies can be configured when the transport network is set up through a protocol such as multi-topology routing (MTR). FIG. 2 illustrates a "red" topology between edge routers 260(1) and 260(2) that includes core routers 270(1), 270(r) and 270(2). FIG. 2 also illustrates a "blue" topology that includes core routers 270(6), 270(3), 270(5), 270(4) and 270(5). The red and blue topologies are mutually exclusive, but this is not a necessary feature of topologies (in fact, both the blue and red topologies have nodes that are all members of the topology that comprises the entire transport network). Selection of a routing parameter, such as a topology identifier, alters the members of the tree built through the provider network.

When building a transport tree across an MPLS network, LDP exchanges labels between transport network routers. LDP provides a transport tree identifier that the transport network routers use to reference the transport tree. In LDP, a transport tree identifier is a Forwarding Equivalency Class (FEC) value. As an example, transport network routers can store a table that maps a transport tree identifier to entries in an LFIB. An ingress edge router can also use the transport tree identifier to associate a transport tree with a multicast datastream, in order to transmit packets in the multicast datastream along a transport tree identified by the transport tree identifier.

Embodiments of the present invention use the FEC to exchange information about the multicast datastream between the edge routers as well as information about the routing parameters and root node router between both the core and edge routers. Information that is pertinent only to the edge routers is provided in an opaque (to the core routers) field of the FEC. Information pertinent to the core routers is provided in a non-opaque field. Further, the entire FEC can be used to provide a unique identifier for the transport tree.

In order to associate a transport tree identifier with a multicast datastream identifier, ingress router 260(1) needs information linking the two pieces of information from egress router 260(2) that initiated the transport tree building. In one embodiment of the present invention, multicast datastream information can be provided to an ingress edge router by encoding the multicast datastream information into a transport tree identifier. As an example of such an embodiment, an egress edge router, in an MPLS transport network, that receives a multicast join request can encode into an FEC opaque field multicast datastream information such as source address, group destination address, and broadcast domain identifier (e.g., VLAN identifier, VPN identifier, resource descriptor, or route distinguisher), which is then inserted into a tree building request. The opaque field is not interpreted by core routers. The core routers within the transport network can use the opaque field value as a mechanism to identify the transport tree without decoding the opaque field value. Once an ingress edge router receives the LDP tree-building request, the ingress edge router can decode the multicast datastream identifier information from the FEC opaque field value. In order to provide consistent encoding and decoding, all edge routers in a transport network agree on a formula to encode the multicast datastream identification information in an FEC. The ingress edge router can then use the multicast datastream identification information to associate the identified multicast datastream with the transport tree.

In embodiments of the present invention, the FEC non-opaque field contains information to be interpreted by the core routers in processing the tree building request. Such information can include an identifier of a root node router for the transport tree. Core routers will use root node identifiers in selection of an upstream next-hop router toward the identified root node leg, (e.g., core router 270(r)). The FEC non-opaque field can also include routing parameters, which will also form the choice of the upstream next-hop router. For example, a topology identifier can determine which of a plurality of routers upstream toward the identified root node should be chosen. Such information can be used by each core router selected for the transport tree in determining an upstream next-hop router. Each topology contains a subset of the routers in the provider network which can be defined, for example, through the use of a multi-topology routing (MTR) protocol.

Although descriptions of the present invention use MPLS as an example of the transport network and MPLS-related protocols, the invention is not limited in its application to MPLS transport networks or MPLS-related protocols.

Figure 4:
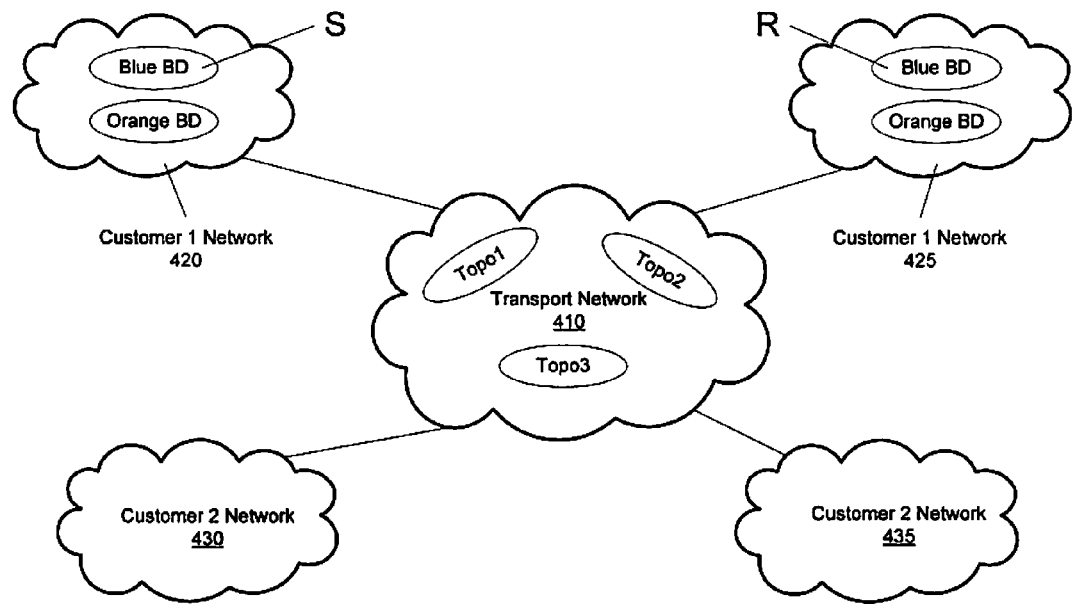
FIG. 4 is a simplified representation of a transport network coupling geographically separated customer networks.

FIG. 4 is a simplified representation of a transport network coupling geographically separated customer networks. Transport network 410 is used by Customers 1 and 2 to couple their respective network subnets. Customer 1 has networks 420 and 425 coupled through transport network 410, while Customer 2 has networks 430 and 435 coupled through transport network 410. In addition, Customer 1 has configured a Blue and Orange broadcast domain (e.g., VPNs) in Customer 1's networks 420 and 425. A source for a multicast transmission is included within the Blue broadcast domain of Customer 1 network 420 and a requesting receiver for that multicast datastream is included within the Blue broadcast domain of Customer 1 network 425.

Transport network has been configured with defined topologies, three of which are Topo1, Topo2 and Topo3. Topo1 and Topo2 are used to transport traffic from Customer 1 while Topo3 is used to transport Customer 2's traffic.

Figure 5:
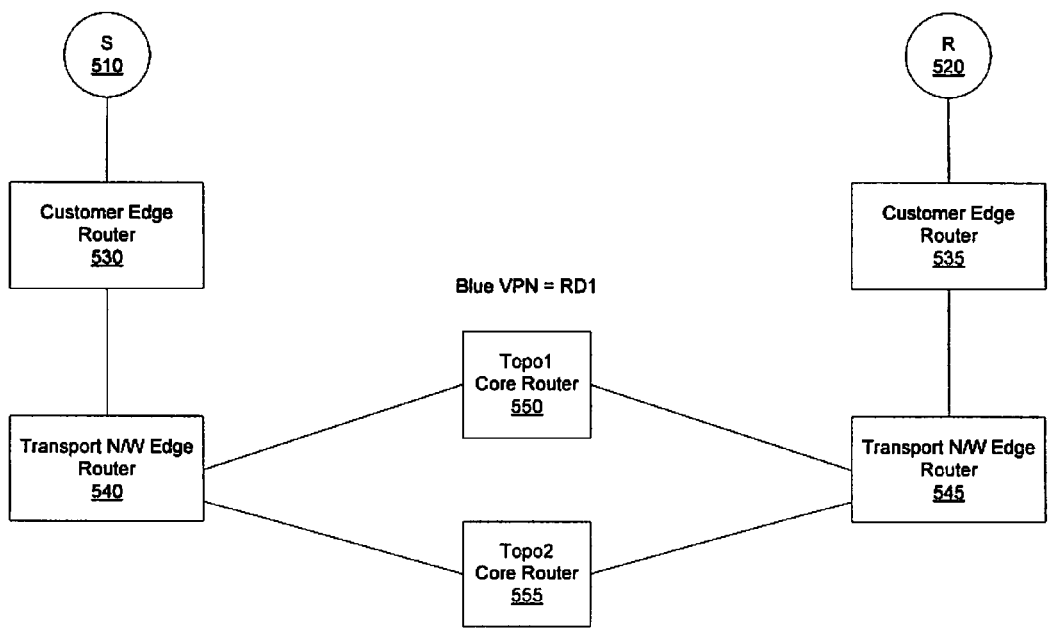
FIG. 5 is a simplified block diagram illustrating a connection between a source and receiver, as illustrated in FIG. 4, in accord with one embodiment of the present invention.

FIG. 5 is a simplified block diagram illustrating a connection between the source and receiver illustrated in FIG. 4, in accord with one embodiment of the present invention. Source 510 is coupled to customer edge router 530 and receiver 520 is coupled to customer edge router 535. Both source 510 and receiver 520 and the respective customer edge routers are members of the Blue broadcast domain which is identified using resource descriptor RD1. Customer edge router 530 is coupled to transport network edge router 540 and customer edge router 535 is coupled to transport network edge router 545. The two transport network edge routers are coupled to each other via one or more transport network core routers 550 corresponding to Topo1 and one or more transport network core routers 555 corresponding to Topo2.

Upon receiving a multicast datastream join message from customer edge router 535, transport network edge router 545 performs a lookup for source 510 in the Blue broadcast domain which results in an address tuple (RD1,S) and an identification of transport edge router 540 as the next-hop edge router. Transport network edge router 545 can then encode RD1, the source address (S) and the group address (G) in an FEC opaque field value of an LDP message. Transport network edge router 545 can also be configured to associate traffic in the Blue broadcast domain with one of the Topo1 or Topo2 topologies. The identification of the associated topology and an identification of the ingress, or root, edge router 540 are included in the non-opaque field of the FEC so that the routers in the transport network can interpret those identifiers. Transport edge router 545 sends the LDP join message that includes the FEC with both opaque and non-opaque field values. The LDP join message can pass from hop to hop within the transport network core, generating local transport tree links from core router to core router (550) within the transport network. Ultimately, transport network edge router 540 receives the LDP join message and determines that the indicated root is itself. In response to such a determination, transport edge router 540 can decode the FEC opaque field to resolve RD1, S, and G. Transport edge router 540 can then look up the (RD1,S) tuple to determine that the source address is in the Blue broadcast domain and the appropriate port of interface toward customer edge router 530. The customer edge router 540 can further associate the built transport tree with the multicast datastream identification (S,G) thereby connecting the transport tree to a multicast datastream tree.

Figure 6:
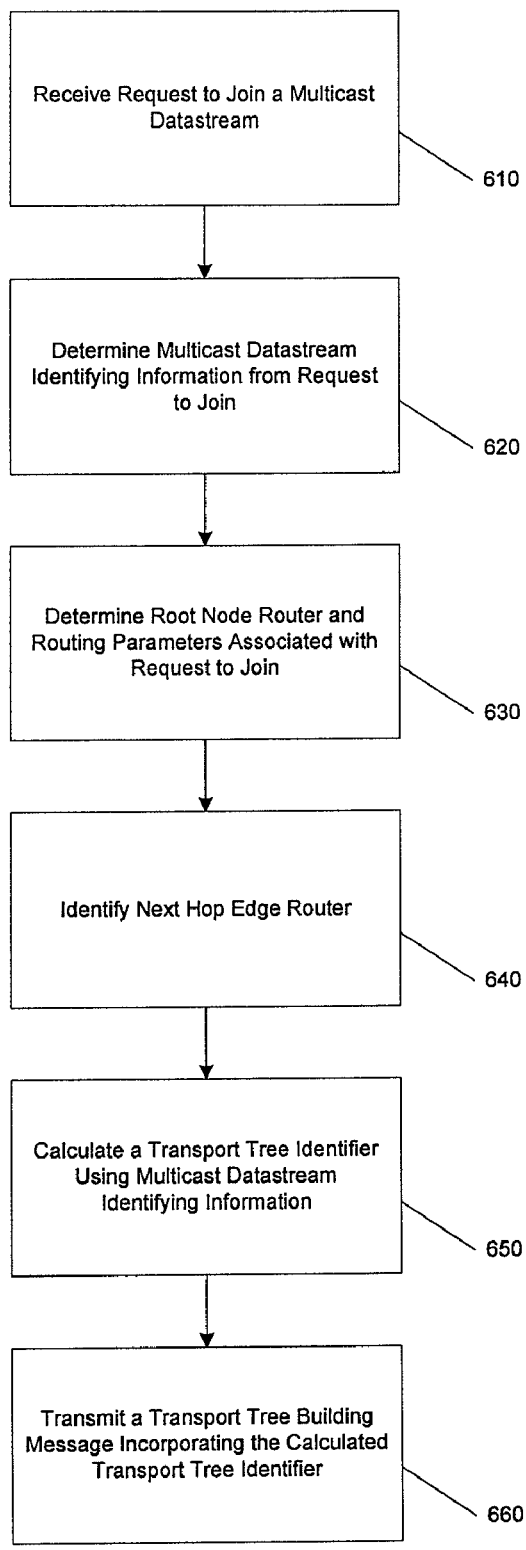
FIG. 6 is a simplified flow diagram illustrating steps performed by an egress router in response to a request to join the multicast datastream, in accord with one embodiment of the present invention.

FIG. 6 is a simplified flow diagram illustrating steps performed by an egress router in response to a request to join the multicast datastream, in accord with one embodiment of the present invention. An egress edge router can receive a request to join a multicast datastream from a downstream node (610). Such a request can take the form of an IGMP message from a network element or a PIM join message from a downstream router. Join messages can include identifiers of a multicast datastream source and group destination address. The egress edge router can determine multicast datastream identifying information from the join message (620). The egress edge router further determines any routing parameters and identifies a root node router associated with the request to join (630). The egress edge router can then identify a next-hop edge router upstream toward the source of the requested multicast datastream, using the routing parameters and root node identifier (640). From the multicast datastream identifying information, the egress edge router can calculate a transport tree identifier (650). The calculated transport tree identifier can be included as an FEC opaque field value in an LDP message sent through the transport network while the FEC non-opaque field value can include the root node identifier and identifiers of the routing parameters. The calculated transport tree identifier can include information about the multicast datastream such as broadcast domain, source address, and group destination address. The egress edge router can then transmit a transport tree building message that includes the transport tree identifier to a next-hop upstream router (660). The transport tree building message (e.g., LDP) will enable the core routers of the transport network to build a transport tree connecting the egress edge router with the identified next-hop edge router.

Figure 7:
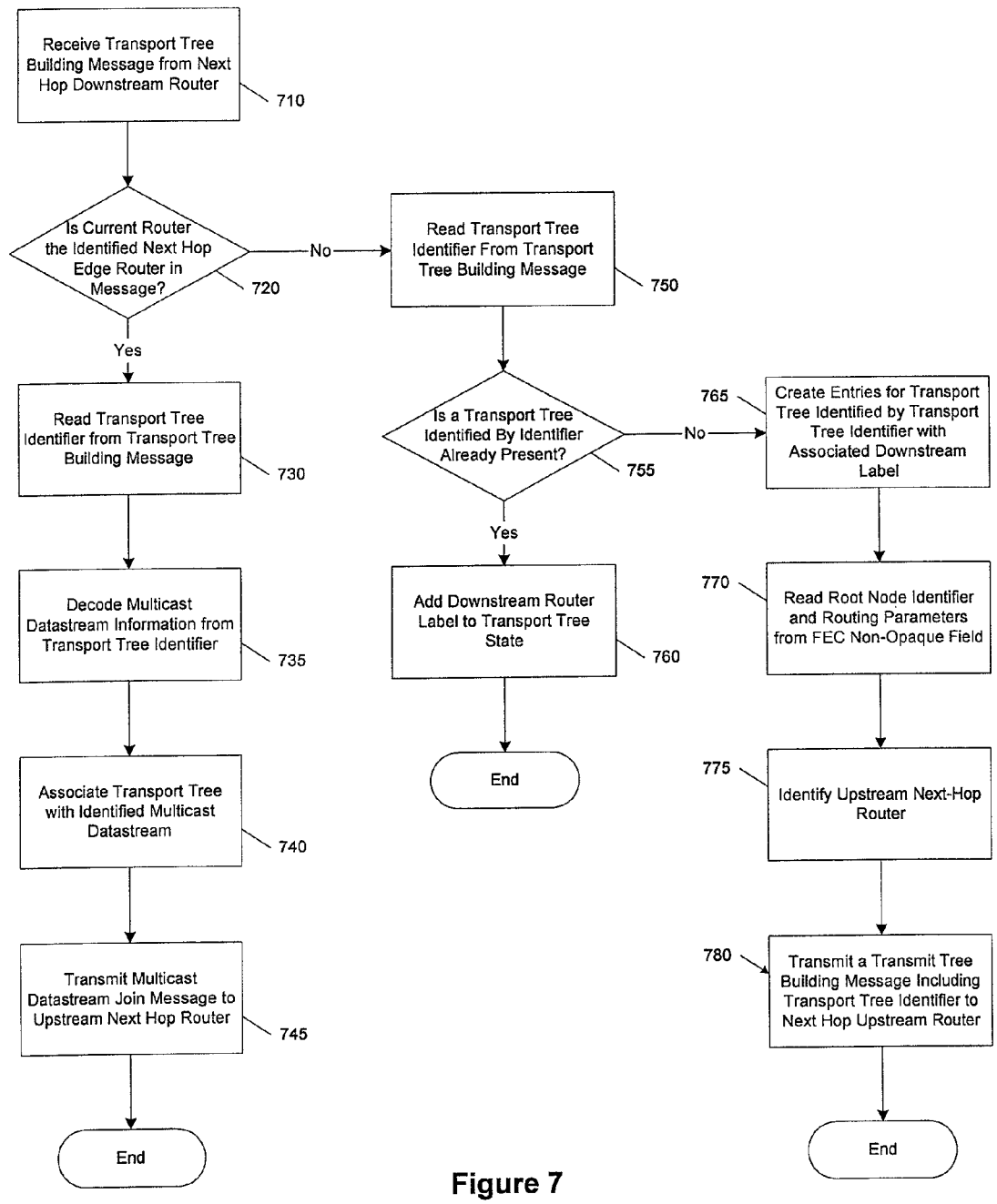
FIG. 7 is a simplified flow diagram illustrating steps performed by a router in response to receiving a transport tree building message incorporating a transport tree identifier in accord with one embodiment of the present invention.

FIG. 7 is a simplified flow diagram illustrating steps that can be performed by a router in response to receiving a transport tree building message incorporating a transport tree identifier in accord with one embodiment of the present invention. The current router receives a transport tree building message from a downstream next-hop router (710). Examining the transport tree building message, the current router can determine whether it is the next-hop edge router identified in the transport tree building message (720). If the current router is the identified next-hop edge router, then the current router can read the transport tree identifier from the transport tree building message (730) and decode the multicast datastream identification information from the transport tree identifier (735) (e.g., from the FEC opaque field value). The current router can then associate the transport tree built by the transport tree building message with the multicast datastream (740). The current router can further transmit a message to join the multicast datastream to an upstream next-hop router toward the source of the multicast datastream (745).

If the current router is not the identified next-hop edge router, then the current router can read the transport tree identifier from the transport tree building message (750) and determine whether a transport tree identified by the transport tree identifier is already present on that router (755). If a transport tree identified by the transport tree identifier is already present on the current router, then a label for the downstream router from which the transport tree building message was received can be added to transport tree state information on the current router. If there is no transport tree corresponding to the transport tree identifier present, then the current router can create transport tree entries corresponding to the transport tree identifier that include, for example, a label for the downstream next-hop router from which the transport tree building message was received (765). The current router then reads the FEC non-opaque fields for the root node identifier and routing parameters (e.g., topology ID) (770). In light of the values in the FEC non-opaque fields, the current router identifies the next-hop upstream router (775). The current router can then transmit a transport tree building message including the transport tree identifier to an upstream next-hop router (780). In this manner, a transport tree corresponding to the transport tree identifier can be built that couples the egress edge router with the ingress edge router across the transport network.

An Example Computing and Network Environment

Figure 8:
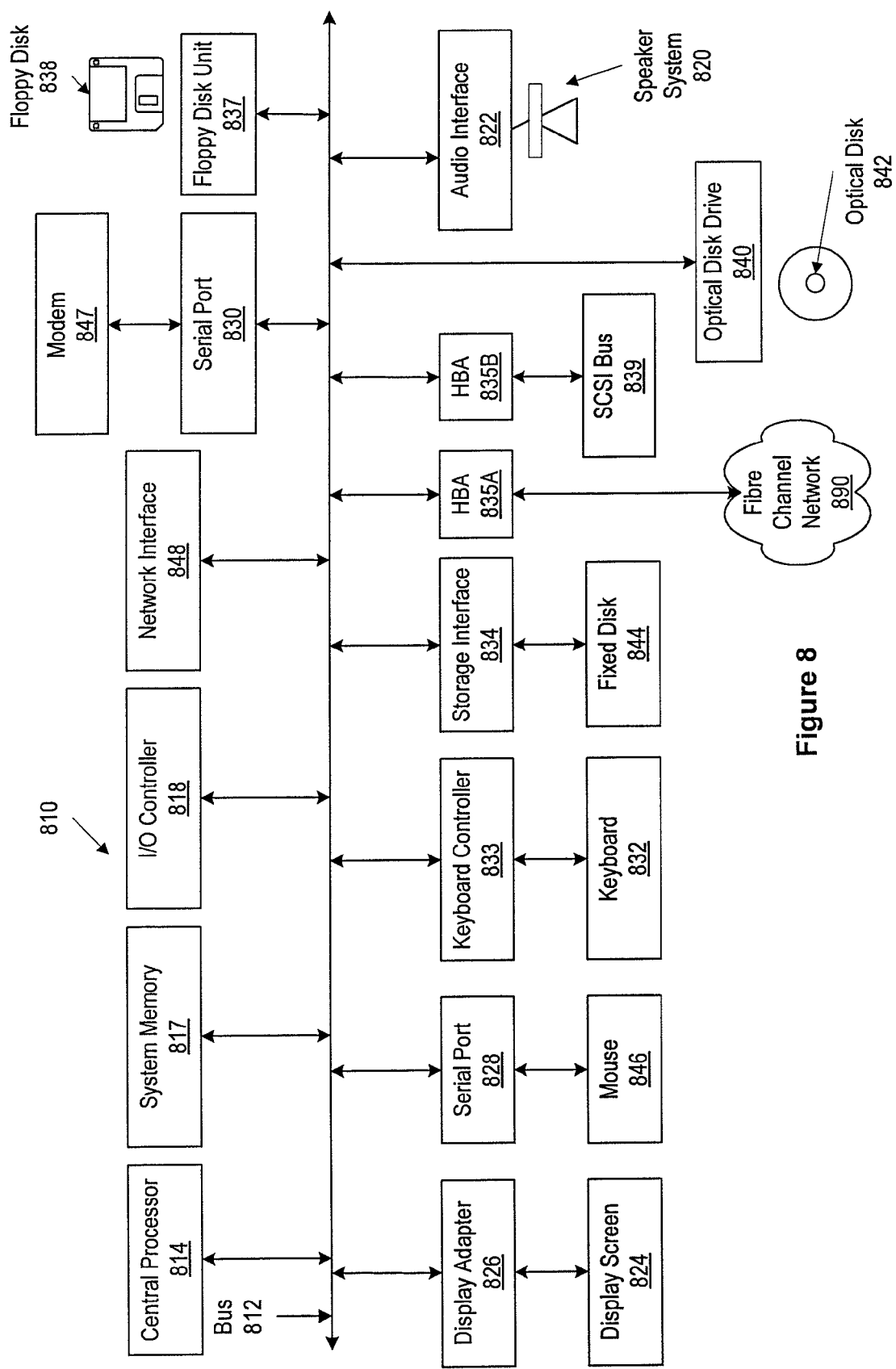
FIG. 8 is a simplified block diagram of a computer system suitable for implementing one embodiment of the present invention.

FIG. 8 depicts a block diagram of a computer system 810 suitable for implementing the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a fibre channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 8 need not be present to practice the present invention. The devices and subsystems can be interconnected in different ways from that shown in FIG. 8. The operation of a computer system such as that shown in FIG. 8 is readily known in the art and is not discussed in detail in this application. Code to implement the present invention can be stored in computer-readable storage media such as one or more of system memory 817, fixed disk 844, optical disk 842, or floppy disk 838. Additionally, computer system 810 can be any kind of computing device using an operating system that provides necessary data access features and capabilities.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
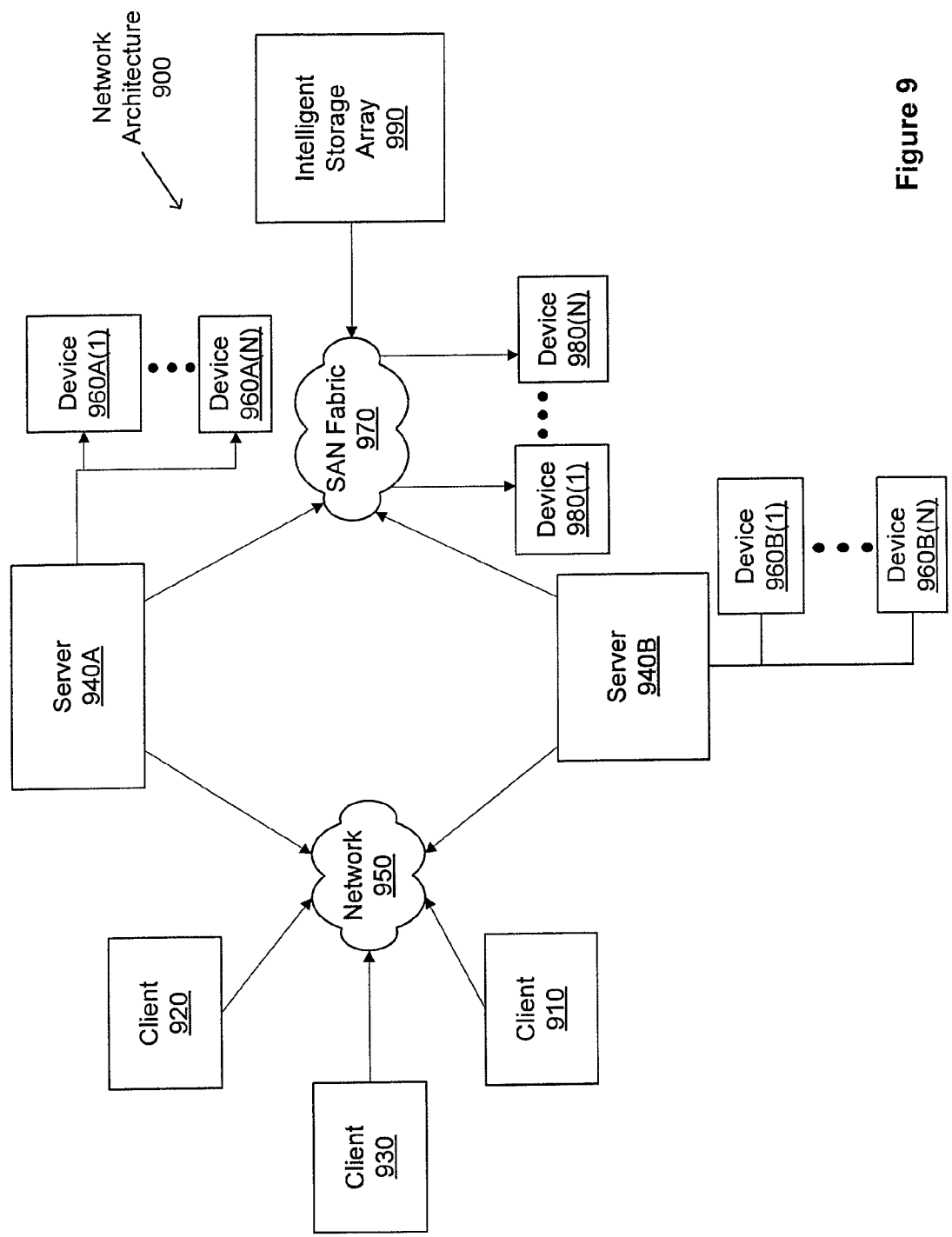
FIG. 9 is a simplified block diagram of a network architecture suitable for implementing one embodiment of the present invention.

FIG. 9 is a block diagram depicting a network architecture 900 in which client systems 910, 920 and 930, as well as storage servers 940A and 940B (any of which can be implemented using computer system 910), are coupled to a network 950. Storage server 940A is further depicted as having storage devices 960A(1)-(N) directly attached, and storage server 940B is depicted with storage devices 960B(1)-(N) directly attached. Storage servers 940A and 940B are also connected to a SAN fabric 970, although connection to a storage area network is not required for operation of the invention. SAN fabric 970 supports access to storage devices 980(1)-(N) by storage servers 940A and 940B, and so by client systems 910, 920 and 930 via network 950. Intelligent storage array 990 is also shown as an example of a specific storage device accessible via SAN fabric 970.

With reference to computer system 810, modem 847, network interface 848 or some other method can be used to provide connectivity from each of client computer systems 910, 920 and 930 to network 950. Client systems 910, 920 and 930 are able to access information on storage server 940A or 940B using, for example, a web browser or other client software (not shown). Such a client allows client systems 910, 920 and 930 to access data hosted by storage server 940A or 940B or one of storage devices 960A(1)-(N), 960B(1)-(N), 980(1)-(N) or intelligent storage array 990. FIG. 9 depicts the use of a network such as the Internet for exchanging data, but the present invention is not limited to the Internet or any particular network-based environment.

An Example Router

Figure 10:
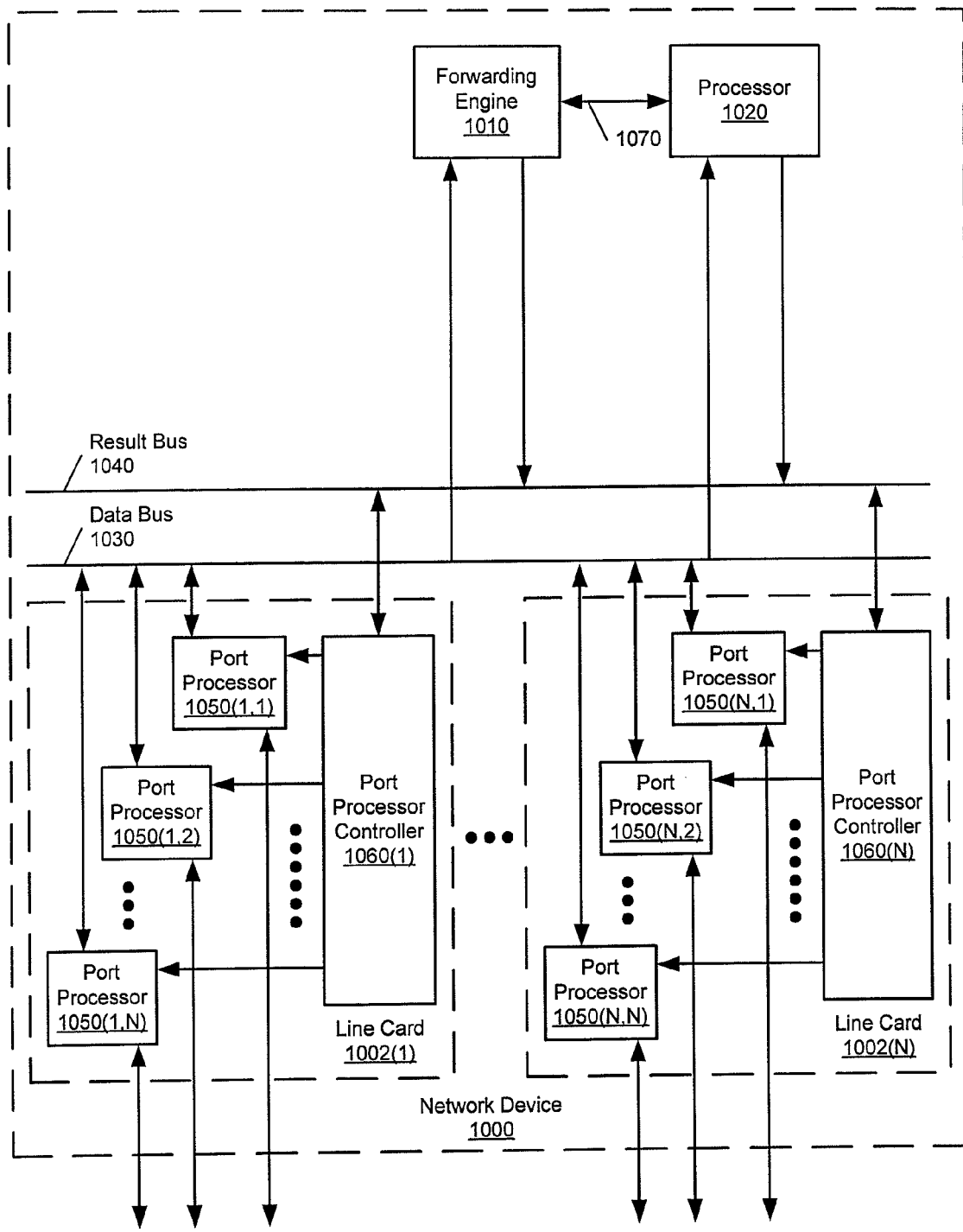
FIG. 10 is a simplified block diagram of a network router element suitable for implementing one embodiment of the present invention.

FIG. 10 is a block diagram illustrating a network router element. In this depiction, network router element 1000 includes a number of line cards (line cards 1002(1)-(N)) that are communicatively coupled to a forwarding engine 1010 and a processor 1020 via a data bus 1030 and a result bus 1040. Line cards 1002(1)-(N) include a number of port processors 1050(1,1)-(N,N) which are controlled by port processor controllers 1060(1)-(N). It will also be noted that forwarding engine 1010 and processor 1020 are not only coupled to one another via data bus 1030 and result bus 1040, but are also communicatively coupled to one another by a communications link 1070.

When a packet is received, the packet is identified and analyzed by a network router element such as network router element 1000 in the following manner, according to embodiments of the present invention. Upon receipt, a packet (or some or all of its control information) is sent from the one of port processors 1050(1,1)-(N,N) at which the packet was received to one or more of those devices coupled to data bus 1030 (e.g., others of port processors 1050(1,1)-(N,N), forwarding engine 1010 and/or processor 1020). Handling of the packet can be determined, for example, by forwarding engine 1010. For example, forwarding engine 1010 may determine that the packet should be forwarded to one or more of port processors 1050(1,1)-(N,N). This can be accomplished by indicating to corresponding one(s) of port processor controllers 1060(1)-(N) that the copy of the packet held in the given one(s) of port processors 1050(1,1)-(N,N) should be forwarded to the appropriate one of port processors 1050(1,1)-(N,N).

In the foregoing process, network security information can be included in a frame sourced by network routing device 1000 in a number of ways. For example, forwarding engine 1010 can be used to detect the need for the inclusion of network security information in the packet, and processor 1020 can be called into service to provide the requisite network security information. This network security information can be included in the packet during the transfer of the packet's contents from one of port processors 1050(1,1)-(N,N) to another of port processors 1050(1,1)-(N,N), by processor 1020 providing the requisite information directly, or via forwarding engine 1010, for example. The assembled packet at the receiving one of port processors 1050(1,1)-(N,N) can thus be made to contain the requisite network security information.

In addition, or alternatively, once a packet has been identified for processing according to the present invention, forwarding engine 1010, processor 1020 or the like can be used to process the packet in some manner or add packet security information, in order to secure the packet. On a node sourcing such a packet, this processing can include, for example, encryption of some or all of the packet's information, the addition of a digital signature or some other information or processing capable of securing the packet. On a node receiving such a processed packet, the corresponding process is performed to recover or validate the packet's information that has been thusly protected.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 810). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed.

The above description is illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed can be made based on the description set forth, without departing from the scope of the invention.

Consequently, the invention is intended to be limited only by the scope of the appended claims, giving full cognizance to equivalents in all respects.

What is claimed is:

1. A method comprising:
receiving a transport tree building message at a first network element, wherein
the first network element comprises a non-edge network element,
the first network element comprises a processor,
the transport tree building message comprises a forwarding equivalency class (FEC) comprising a transport tree identifier,
the transport tree identifier comprises an opaque field and a non-opaque field,
the opaque field is not interpreted by the first network element, the non-opaque field comprises a route property identifier,
the route property identifier comprises a topology identifier as a result of an edge router modifying the FEC to include the topology identifier prior to the receiving, wherein the modifying is performed in response to the edge router receiving a multicast join message, and
the topology identifier specifies a first topology of a plurality of topologies; and
selecting an upstream next hop router in accord with the topology identifier, wherein the selecting is performed by the processor.

2. The method of claim 1 wherein the non-opaque field further comprises a root node identifier.

3. The method of claim 2 wherein said selecting the upstream next hop router further comprises:
using the root node identifier to perform said selecting the upstream next hop router toward the identified root node.

4. The method of claim 1 further comprising:
constraining said selecting the upstream next hop router using the route property identifier.

5. The method of claim 1 wherein the plurality of topologies comprises a common upstream network node.

6. The method of claim 5 wherein the common upstream network node is a root node identified by the non-opaque field.

7. The method of claim 1 wherein the opaque field comprises one or more identifiers for a multicast datastream.

8. An apparatus comprising:
a plurality of network line cards, wherein
a first network line card of the plurality of network line cards comprises a non-edge network element, and
the first network line card is configured to receive a transport tree building message for a transport tree, wherein
the transport tree building message comprises a forwarding equivalency class (FEC) comprising a transport tree identifier,
the transport tree identifier comprises an opaque field and a non-opaque field,
information comprising the opaque field is not interpreted,
the non-opaque field comprises a route property identifier,
the route property identifier comprises a topology identifier as a result of an edge network element modifying the FEC to include the topology identifier prior to the receiving, wherein the modifying is performed in response to the edge network element receiving a multicast join message, and
the topology identifier specifies a first topology of a plurality of topologies;
a switch fabric comprising a plurality of ports, wherein
each of the plurality of ports is coupled to a corresponding one of the plurality of network line cards, and
a first port is coupled to the first network line card; and
a processor coupled to the switch fabric, wherein the processor is configured to read data comprising the non-opaque field, and
select an upstream next hop router in accord with the topology identifier.

9. The apparatus of claim 8, wherein
the non-opaque field further comprises a root node identifier, and
the processor is further configured to perform said selecting the upstream next hop router using the root node identifier to select a router toward the identified root node.

10. The apparatus of claim 8 wherein the processor is further configured to constrain said selecting the upstream next hop router using the route property identifier.

11. The apparatus of claim 8 wherein the route property identifier comprises:
identification of a topology in a network comprising the upstream next hop router, wherein the topology is one of a plurality of topologies comprising a common upstream network node.

12. The apparatus of claim 11 wherein the common upstream network node is a root node identified by the non-opaque field.

13. An apparatus comprising:
a plurality of network line cards, wherein
a first network line card of the plurality of network line cards comprises a non-edge network element, and
the first network line card is configured to receive a transport tree building message for a transport tree, wherein
the transport tree building message comprises
a forwarding equivalency class (FEC) comprising a transport tree identifier,
the transport tree identifier comprises an opaque field and a non-opaque field,
information comprising the opaque field is not interpreted,
the non-opaque field comprises a route property identifier,
the route property identifier comprises a topology identifier as a result of an edge network element modifying the FEC to include the topology identifier prior to the receiving, wherein the modifying is performed in response to the edge network element receiving a multicast join message, and
the topology identifier specifies a first topology of a plurality of topologies;
a switch fabric comprising a plurality of ports, wherein
each of the plurality of ports is coupled to a corresponding one of the plurality of network line cards, and
a first port is coupled to the first network line card;
means for reading data comprising the non-opaque field; and
means for selecting an upstream next hop router in accord with the topology identifier.

14. The apparatus of claim 13 further comprising:
means for selecting the upstream next hop router using a root node identifier to select a router toward the identified root node, wherein the non-opaque field further comprises the root node identifier.

15. The apparatus of claim 13 further comprising:

means for constraining said selecting the upstream next hop router using the route property identifier.

16. The apparatus of claim 13 wherein the route property identifier comprises: identification of a topology in a network comprising the upstream next hop router, wherein the topology is one of a plurality of topologies comprising a common upstream network node.

17. The apparatus of claim 16 wherein the common upstream network node is a root node identified by the non-opaque field.

* * * * *